US012764363B2

(12) United States Patent
Tamayo et al.

(10) Patent No.: US 12,764,363 B2
(45) Date of Patent: Oct. 13, 2026

(54) MEDIA PRESENTATION MANAGEMENT

(71) Applicant: Capital One Services, LLC, McLean, VA (US)

(72) Inventors: Bryan Tamayo, Allen, TX (US); William Merkel, Garland, TX (US)

(73) Assignee: Capital One Services, LLC, McLean, VA (US)

(*) Notice: Subject to any disclaimer, the term of this patent is extended or adjusted under 35 U.S.C. 154(b) by 127 days.

(21) Appl. No.: 18/781,713

(22) Filed: Jul. 23, 2024

(65) Prior Publication Data

US 2026/0032299 A1 Jan. 29, 2026

(51) Int. Cl.
*H04N 21/25* (2011.01)
*H04N 21/431* (2011.01)

(52) U.S. Cl.
CPC ......... *H04N 21/251* (2013.01); *H04N 21/431* (2013.01)

(58) Field of Classification Search
None
See application file for complete search history.

(56) References Cited

U.S. PATENT DOCUMENTS 7,937,725 B1 * 5/2011 Schaffer ............ H04N 21/4826 725/47
11,954,161 B2 4/2024 Benzatti et al.
2007/0089129 A1 * 4/2007 Verhaegh ............ H04N 21/466 725/35
2011/0289533 A1 * 11/2011 White ............ H04N 21/4622 725/46
2019/0149879 A1 * 5/2019 Siddiq ............ H04N 21/252 725/14
2023/0252068 A1 * 8/2023 Yasir ............ G06F 16/9535 707/748

* cited by examiner

*Primary Examiner* — Junior O Mendoza
(74) *Attorney, Agent, or Firm* — Harrity & Harrity, LLP

(57) ABSTRACT

In some implementations, a system may determine based on express preference information associated with media presentation on a user device, and based on behavior information associated with at least first media presented on the user device, derived preference information associated with media presentation on the user device. The system may generate a media presentation profile that indicates at least some of the express preference information and at least some of the derived preference information. The system may send, to the user device, the media presentation profile for presentation on the user device in association with the first media.

20 Claims, 10 Drawing Sheets

MEDIA PRESENTATION MANAGEMENT

BACKGROUND

A media recommendation system predicts and delivers media recommendations to a user of a user device, often by analyzing preferences and behavior of the user.

SUMMARY

Some implementations described herein relate to a system for media presentation management. The system may include one or more memories and one or more processors communicatively coupled to the one or more memories. The one or more processors may be configured to obtain express preference information that indicates one or more express user preferences associated with media presentation on a user device. The one or more processors may be configured to obtain behavior information that indicates one or more user interactions with at least first media presented on the user device. The one or more processors may be configured to determine, based on the express preference information and based on the behavior information, derived preference information that indicates one or more derived user preferences associated with media presentation on the user device. The one or more processors may be configured to generate a media presentation profile that indicates at least some of the express preference information and at least some of the derived preference information. The one or more processors may be configured to send, to the user device, the media presentation profile for presentation on the user device in association with the first media. The one or more processors may be configured to receive, from the user device and based on sending the media presentation profile, preference modification information that indicates a modification to at least one of the one or more express user preferences or at least one of the one or more derived user preferences. The one or more processors may be configured to update, based on the preference modification information, at least one of the express preference information or the derived preference information. The one or more processors may be configured to determine, based on the updated at least one of the express preference information or the derived preference information, media recommendation information that identifies at least second media. The one or more processors may be configured to send, to the user device, the media recommendation information for presentation on the user device in association with the first media.

Some implementations described herein relate to a non-transitory computer-readable medium that stores a set of instructions. The set of instructions, when executed by one or more processors of a system for media presentation management, may cause the system for media presentation management to obtain express preference information associated with media presentation on a user device. The set of instructions, when executed by one or more processors of the system for media presentation management, may cause the system for media presentation management to obtain behavior information associated with at least first media presented on the user device. The set of instructions, when executed by one or more processors of the system for media presentation management, may cause the system for media presentation management to determine, based on the express preference information and based on the behavior information, derived preference information associated with media presentation on the user device. The set of instructions, when executed by one or more processors of the system for media presentation management, may cause the system for media presentation management to generate a media presentation profile that indicates at least some of the express preference information and at least some of the derived preference information. The set of instructions, when executed by one or more processors of the system for media presentation management, may cause the system for media presentation management to send, to the user device, the media presentation profile for presentation on the user device in association with the first media.

Some implementations described herein relate to a method of facilitating media presentation management. The method may include determining, by a system, based on express preference information associated with media presentation on a user device, and based on behavior information associated with at least first media presented on the user device, derived preference information associated with media presentation on the user device. The method may include generating, by the system, a media presentation profile that indicates at least some of the express preference information and at least some of the derived preference information. The method may include sending, by the system and to the user device, the media presentation profile for presentation on the user device in association with the first media.

DETAILED DESCRIPTION

Figure 1A:
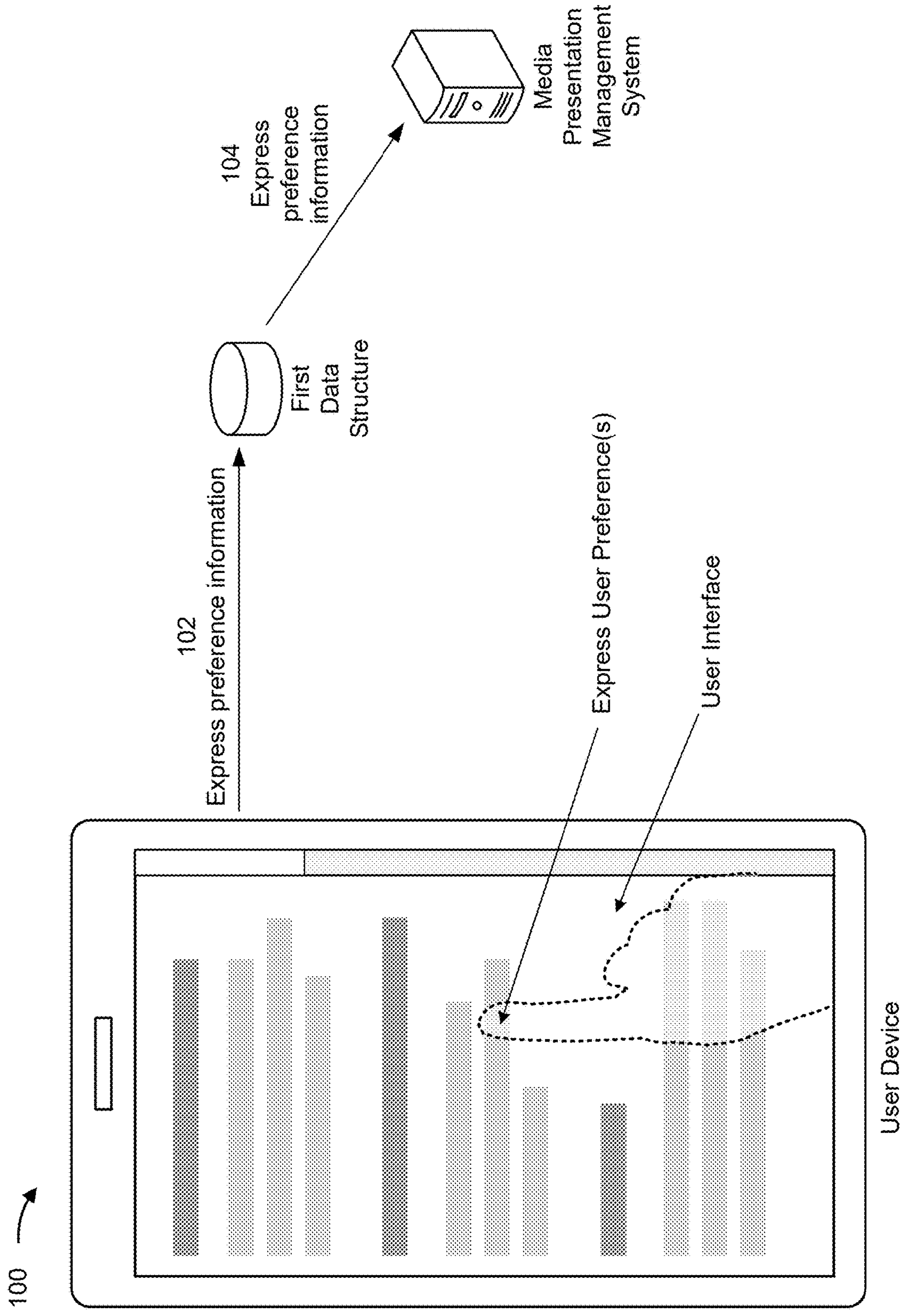
FIGS. 1A-1G are diagrams of an example associated with media presentation management, in accordance with some embodiments of the present disclosure.

The following detailed description of example implementations refers to the accompanying drawings. The same reference numbers in different drawings may identify the same or similar elements.

A media recommendation system can be configured to suggest media (e.g., text, video, audio, video and audio, or another type of media) to a user of a user device. For example, a media recommendation system can allow a user to input initial media preferences and then the media recommendation system uses data evaluation and/or machine learning techniques to analyze the user's behavior (e.g., related to the user's interactions with other media) to generate media recommendations that are personalized for the user.

Such media recommendation systems are typically a "black box," where media preferences that are derived by the media recommendation system are inaccessible to the user. Further, media recommendation systems often suffer from a feedback loop problem, where particular types of media recommendations become reinforced by the user interacting with those media recommendations, which leads to more recommendations related to the particular types of media. This can create a "runaway" media recommendation problem, where the user is no longer being recommended media that is related to the user's initial media preferences (that the user expressly input to the media recommendation system). This can lead to user dissatisfaction with the media recommendations, and the user, using the user device, may consume computing resources (e.g., processing resources, memory resources, communication resources, and/or power resources, among other examples) to seek additional media recommendations (e.g., from the media recommendation systems, or from another source).

Some implementations described herein include a media presentation management system. The media presentation management system obtains express preference information (e.g., that indicates one or more express user preferences associated with media presentation on a user device) and behavior information (e.g., that indicates one or more user interactions with at least first media presented on the user device), which the media presentation management system processes to determine derived preference information (e.g., that indicates one or more derived user preferences associated with media presentation on the user device). The media presentation management system then generates a media presentation profile that indicates at least some of the express preference information and at least some of the derived preference information, and sends the media presentation profile for presentation on the user device. In this way, user can observe (e.g., at the same time), on the user device, the user's expressly input media preferences and the derived media preferences (e.g., as determined by the media presentation management system), which is not otherwise available to users of typical media recommendation systems.

Further, the media presentation management system can update the derived preference information in real-time (or near real-time), such that the media presentation profile, which includes up-to-date derived preference information (e.g., that is based, at least in part, on the user's behavior in relation to the first media that is presented on the user device), can be presented on the user device in association with the first media (e.g., contemporaneously with presentation of the first media). This type of real-time recommendation based on a user's behavior in relation to currently presented media is not available from typical media recommendation systems (e.g., that analyze historical behavior information of a user in relation to different media).

Additionally, the user can interact with the media presentation profile that is presented on the profile to input preference modification information (e.g., that indicates a modification to at least one of the one or more express user preferences or at least one of the one or more derived user preferences). The media presentation management system can obtain the preference modification information and thereby update at least one of the express preference information or the derived preference information. The media presentation management system then determines, based on the updated at least one of the express preference information or the derived preference information, media recommendation information (e.g., that identifies at least second media). The media presentation management system then sends, to the user device, the media recommendation information for presentation on the user device.

In this way, the media presentation management system enables the user to update the express preference information and/or the derived preference information, such as to allow the media presentation management system to generate and provide media recommendation information that is aligned with the user's current preferences (e.g., after the user has reviewed the media presentation profile). This acts as a check on the runaway media recommendation problem, where the user is able to provide input that enables more relevant media recommendations to the user. This improves user satisfaction with the media recommendation information provided by the media presentation management system, and therefore conserves computing resources (e.g., processing resources, memory resources, communication resources, and/or power resources, among other examples) of the user's user device that would otherwise be used to seek additional media recommendations (e.g., if the media recommendation information were less relevant to the user).

FIGS. 1A-1G are diagrams of an example 100 associated with media presentation management. As shown in FIGS. 1A-1G, example 100 includes a user device, a media presentation management system, and one or more data structures (shown as a first data structure and a second data structure). These devices are described in more detail in connection with FIGS. 2 and 3. The user device may be associated with a user. The user device may implement a user interface (e.g., a graphical user interface), such as a web browser. For example, the user device may include a web browser application, which the user device may execute to load web pages.

As shown in FIG. 1A, and by reference number 102, the user device may provide express preference information. The express preference information may indicate one or more express user preferences associated with media presentation on the user device. For example, as shown in FIG. 1A, the user of the user device may interact with the user interface to input the one or more express user preferences associated with media presentation on the user device. The one or more express user preferences may indicate, for example, at least one preferred type of media (e.g., media that includes text, audio, video, audio and video, or another type of media), at least one preferred media category (e.g., a media genre, a media style, a media language, and/or a media country of origin, among other examples), or another type of express user preference. In some implementations, the one or more express user preferences may indicate one or more types of media that the user is interested in having presented on the user device (e.g., for the user to consume).

As further shown by reference number 102, the user device may provide the express preference information to the first data structure. For example, the user device may send the express preference information to the first data structure for the first data structure to store the express preference information. In some implementations, the user device may provide the express preference information to the first data structure in real-time (or near real-time). For example, the user device may provide a first portion of the express preference information to the first data structure after (e.g., without delay, or with a delay on the order of seconds) the user inputs the first portion of the express preference information into the user device, may provide a second portion of the express preference information to the first data structure after (e.g., without delay, or with a delay on the order of seconds) the user inputs the second portion of the express preference information into the user device, and so on.

The first data structure may be configured to store the express preference information that is provided by the user device, and, optionally, may be configured to store express preference information that is provided by other user devices. The first data structure may be included in the media presentation management system and/or may be accessible to the media presentation management system (e.g., to allow the media presentation management system to access information stored by the first data structure).

Accordingly, the media presentation management system may obtain the express preference information. For example, as shown by reference number 104, the media presentation management system may obtain the express preference information from the first data structure. As an alternative example, the media presentation management system may obtain the express preference information directly from the user device (e.g., without the express preference information being saved in the first data structure). In some implementations, the media presentation management system may be configured to manage media presentation on the user device, and so may thereby obtain the express preference information to facilitate media presentation management on the user device, as further described herein.

Figure 1B:
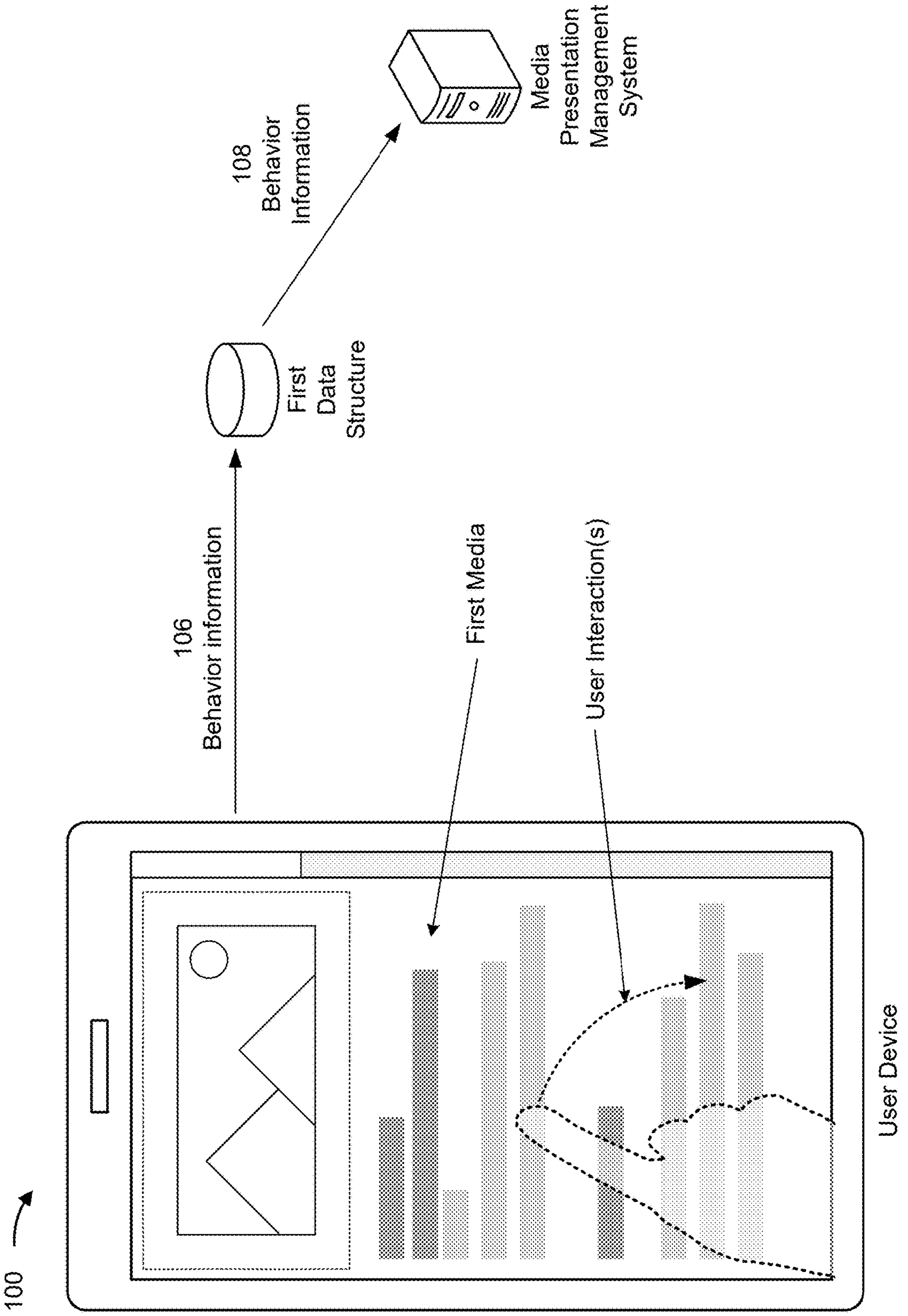

As shown in FIG. 1B, first media may be presented (e.g., visually presented, audibly presented, and/or haptically presented) on the user device (e.g., via the user interface of the user device). In some implementations, the user device may collect behavior information (e.g., of the user) that indicates one or more user interactions (e.g., via the user interface of the user device) with at least the first media presented on the user device (e.g., the first media as well as other media currently or previously presented on the user device). The one or more user interactions may include, for example, the user scrolling through one or more content pages associated with at least the first media, the user selecting or interacting with one or more objects associated with at least the first media, the user pausing or starting presentation of at least the first media, and/or the user adjusting a volume or another presentation setting associated with at least the first media.

As shown by reference number 106, the user device may provide the behavior information. In some implementations, the user device may provide the behavior information to the first data structure (e.g., that is also configured to store behavior information), or to another data structure. For example, the user device may send the behavior information to the first data structure for the first data structure to store the behavior information. In some implementations, the user device may provide the behavior information to the first data structure in real-time (or near real-time). For example, the user device may provide a first portion of the behavior information to the first data structure after (e.g., without delay, or with delay on the order of seconds) the user device collects the first portion of the behavior information, may provide a second portion of the behavior to the first data structure after (e.g., without delay, or with a delay on the order of seconds) the user device collects the second portion of the behavior information, and so on.

As shown by reference number 108, the media presentation management system may obtain the behavior information. For example, the media presentation management system may obtain the behavior information from the first data structure. As an alternative example, the media presentation management system may obtain the behavior information directly from the user device (e.g., without the behavior information being saved in the first data structure). In some implementations, the media presentation management system may be configured to manage media presentation on the user device, and so may thereby obtain the behavior information to facilitate media presentation management on the user device, as further described herein.

Figure 1C:
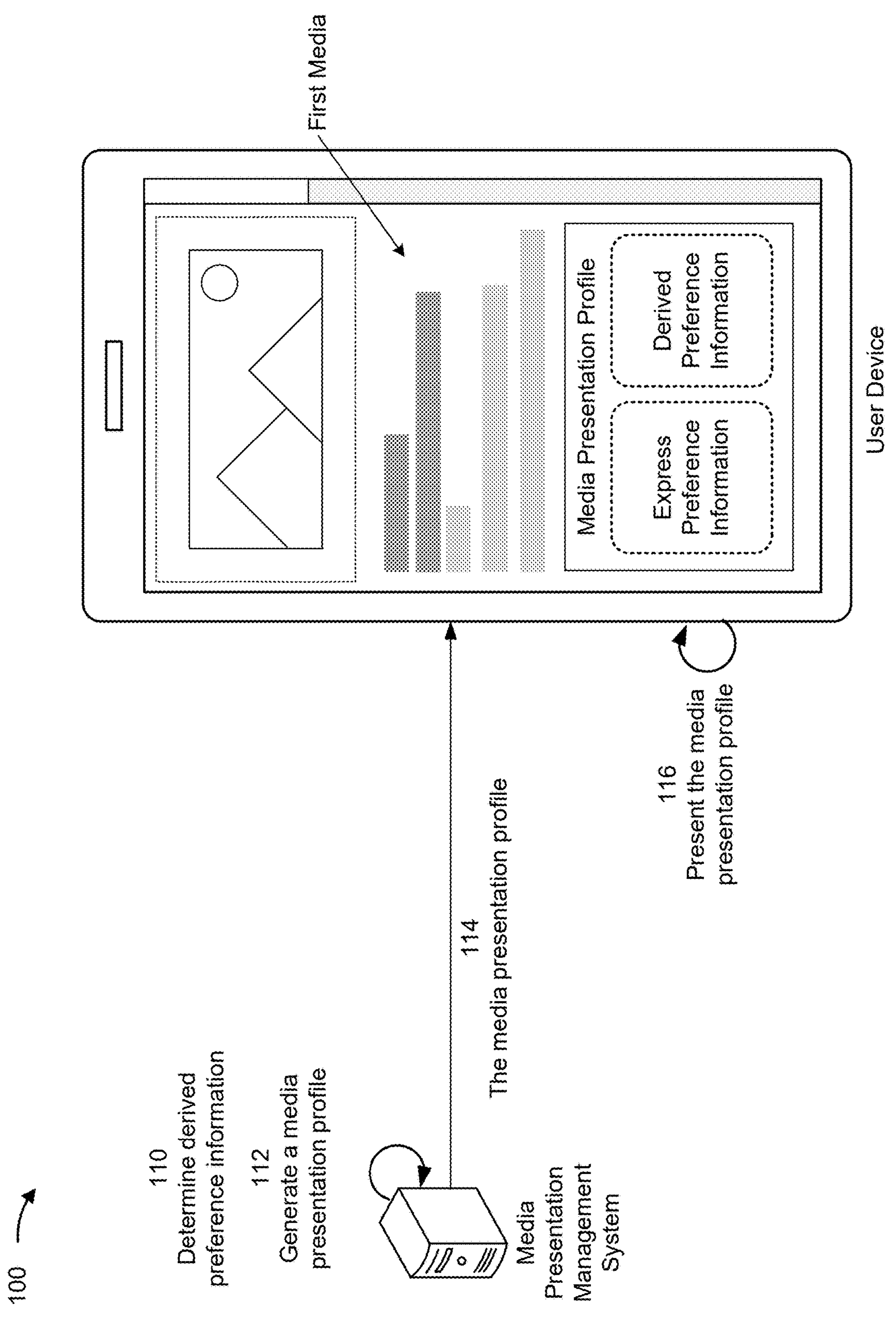

As shown in FIG. 1C, and by reference number 110, the media presentation management system may determine derived preference information. The derived preference information may indicate, for example, one or more derived user preferences associated with media presentation on the user device (e.g., that includes at least one user preference, associated with media presentation on the user device, that is different than the one or more express user preferences indicated by the express preference information). The one or more derived user preferences may indicate, for example, at least one preferred type of media, at least one preferred media category, or other type of derived user preference. In some implementations, the one or more derived user preferences may indicate one or more types of media that the user is determined (e.g., by the media presentation management system) to have an interest in having presented on the user device (e.g., for the user to consume).

The media presentation management system may determine the derived preference information based on at least one of the express preference information or the behavior information. For example, the media presentation management system may process (e.g., using a derived preference analysis technique, which may include using at least one machine learning model technique) the express preference information and/or the behavior information to determine the derived preference information.

As shown by reference number 112, the media presentation management system may generate a media presentation profile. The media presentation profile may indicate at least some of the express preference information and at least some of the derived preference information. For example, the media presentation profile may indicate at least one express user preference, of the one or more express user preferences, indicated by the express preference information, and may indicate at least one derived user preference, of the one or more derived user preferences, indicated by the derived preference information.

As shown by reference number 114, the media presentation management system may provide the media presentation profile. For example, the media presentation management system may send the media presentation profile to the user device, such as for presentation on the user device (e.g., via the user interface of the user device).

Accordingly, as further shown in FIG. 1C and by reference number 116, the user device may present the media presentation profile. For example, the media presentation profile may be presented (e.g., visually presented, audibly presented, and/or haptically presented) on the user device via the user interface of the user device.

In some implementations, the media presentation management system may send the media presentation profile to the user device for presentation on the user device in association with the first media. For example, the media presentation management system may send the media presentation profile to the user device to enable contemporaneous presentation, on the user device, of at least some of the first media and at least some of the media presentation profile (e.g., as shown in FIG. 1C), or to enable presentation of at least some of the first media at a first time and at least some of the media presentation profile at a second time that occurs after the first time (e.g., the media presentation profile is presented after the first media without delay, or with a delay on the order of seconds). In some implementations, the media presentation profile may be presented on the user device as an overlay, a portion of a content page, or a toolbar of a web browser application, among other examples.

Figure 1D:
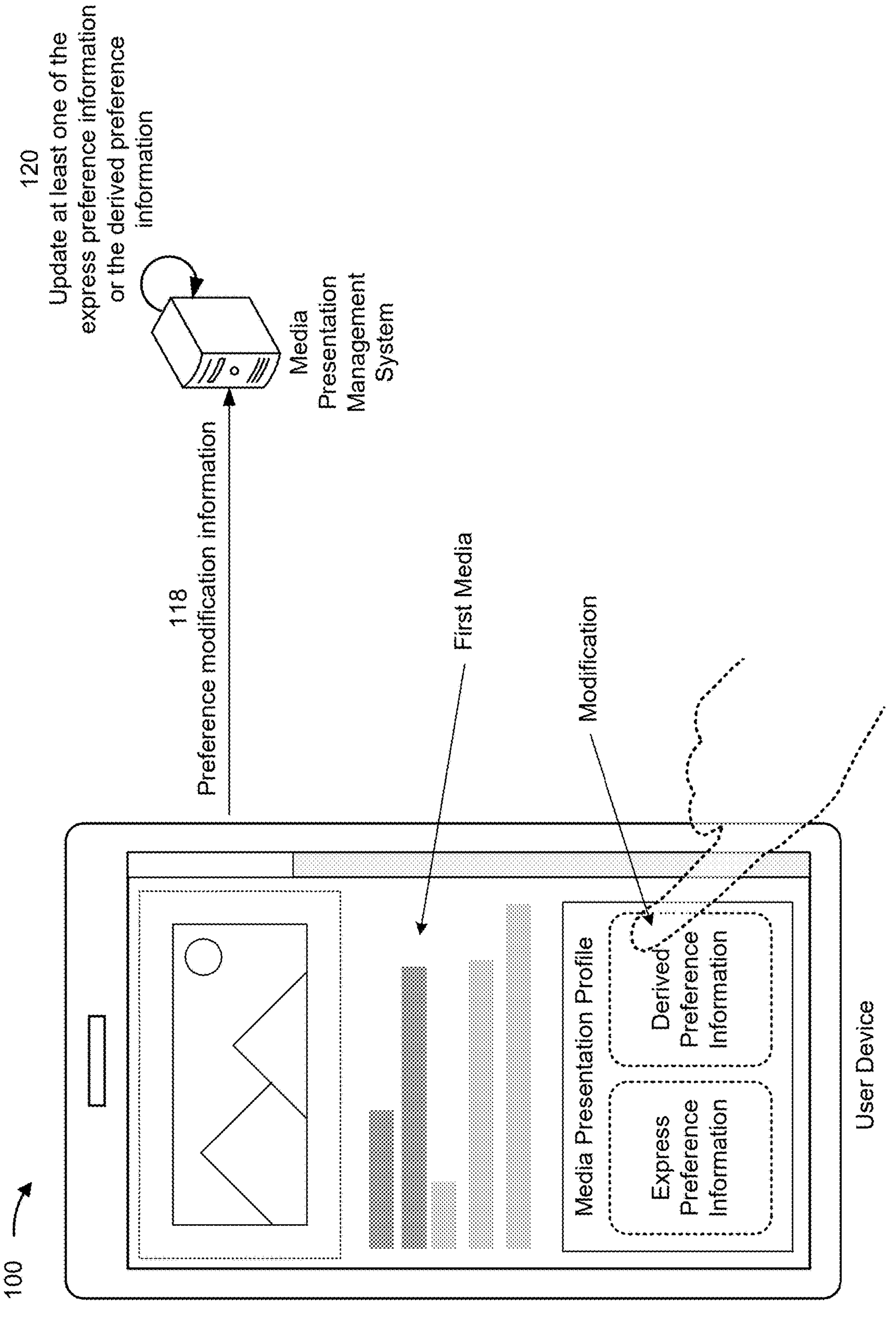

As shown in FIG. 1D, the user device may collect preference modification information associated with presentation of the media presentation profile. For example, the preference modification information may indicate a modification to the express preference information (e.g., to at least one of the one or more express user preferences of the express preference information) and/or a modification to the derived preference information (e.g., to at least one of the one or more derived user preferences of the derived preference information). The user device may collect the preference modification information as a result of the user interacting with the media presentation profile (e.g., via the user interface of the user device), such as by the user selecting (or deselecting) an object associated with the media presentation profile, by the user adjusting an "agree or disagree" indicator of the media presentation profile, or by the user manipulating another type of interaction component of the media presentation profile.

As shown by reference number 118, the user device may provide the preference modification information. For example, the user device may send the preference modification information to the media presentation management system (e.g., directly to the media presentation management system). Accordingly, the media presentation management system may obtain the preference modification information, such as by receiving the preference modification information from the user device.

As shown by reference number 120, the media presentation management system may update at least one of the express preference information or the derived preference information (e.g., based on the preference modification information). For example, when the preference modification information indicates a modification to the express preference information (e.g., to at least one of the one or more express user preferences of the express preference information), the media presentation management system may update the express preference information to indicate the modification (e.g., to indicate the modification to the least one of the one or more express user preferences of the express preference information). Additionally, or alternatively, when the preference modification information indicates a modification to the derived preference information (e.g., to at least one of the one or more derived user preferences of the derived preference information), the media presentation management system may update the derived preference information to indicate the modification (e.g., to indicate the modification to the least one of the one or more derived user preferences of the derived preference information).

Figure 1E:
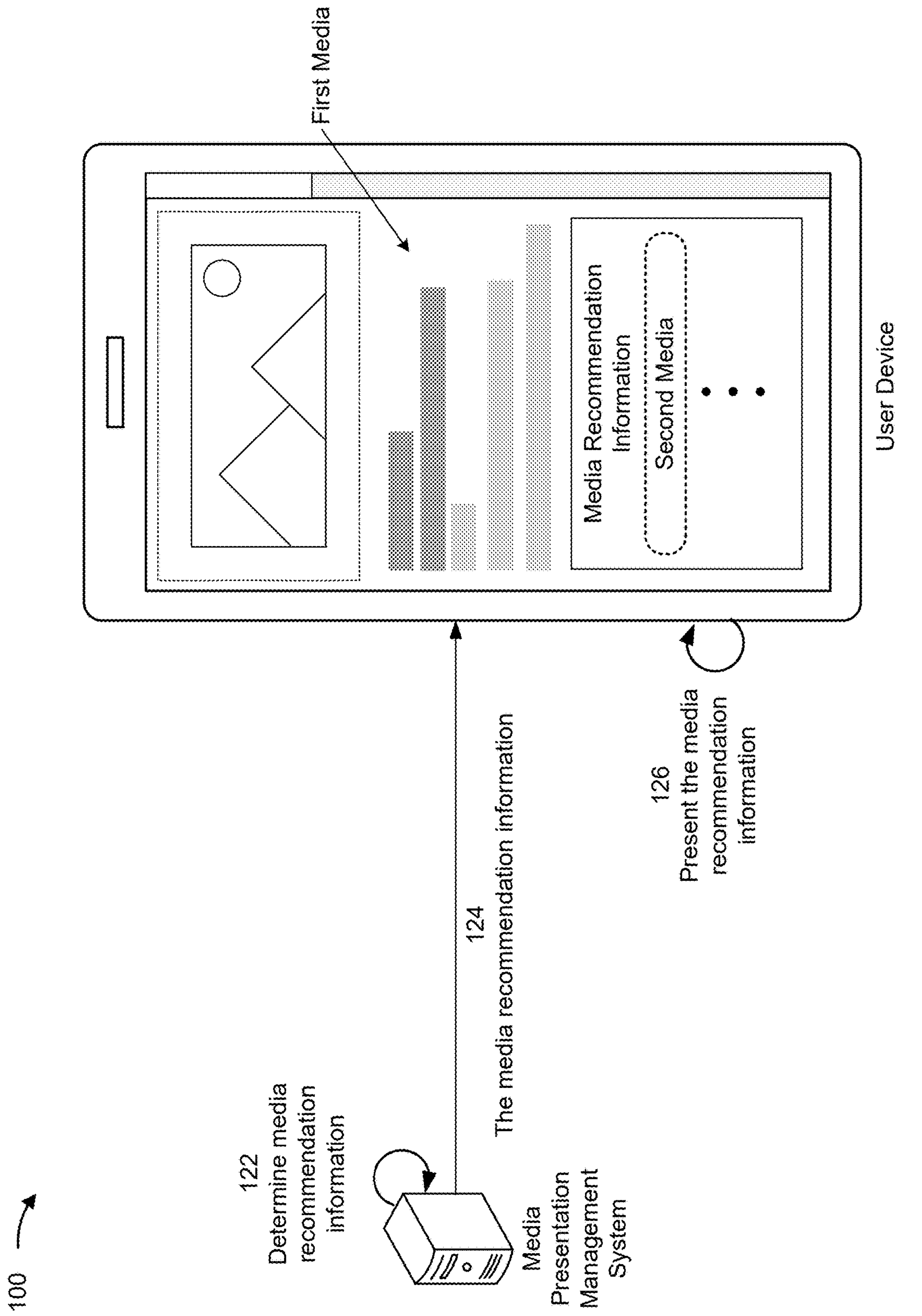

As shown in FIG. 1E, and by reference number 122, the media presentation management system may determine media recommendation information. The media recommendation information may identify, for example, at least second media (e.g., that is able to be presented on the user device).

In some implementations, the media presentation management system may process (e.g., using a recommendation analysis technique, which may include using a using at least one machine learning model technique) the updated at least one of the express preference information or the derived preference information to determine the media recommendation information. That is, the media presentation management system may process the updated express preference information (e.g., that indicates the modification to the least one of the one or more express user preferences of the express preference information) and/or the updated derived preference information (e.g., that indicates the modification to the least one of the one or more derived user preferences of the derived preference information) to determine the media recommendation information.

As shown by reference number 124, the media presentation management system may provide the media recommendation information. For example, the media presentation management system may send the media recommendation information to the user device, such as for presentation on the user device (e.g., via the user interface of the user device).

Accordingly, as further shown in FIG. 1E and by reference number 126, the user device may present the media recommendation information. For example, the media recommendation information may be presented (e.g., visually presented, audibly presented, and/or haptically presented) on the user device via the user interface of the user device.

In some implementations, the media presentation management system may send the media recommendation information to the user device for presentation on the user device in association with the first media. For example, the media presentation management system may send the media presentation profile to the user device to enable contemporaneous presentation, on the user device, of at least some of the first media and at least some of the media recommendation information (e.g., as shown in FIG. 1E), or to enable presentation of at least some of the first media at a first time and at least some of the media recommendation information at a second time that occurs after the first time (e.g., the media recommendation information is presented after the first media without delay, or with a delay on the order of seconds). In some implementations, the media recommendation information may be presented on the user device as an overlay, a portion of a content page, or a toolbar of a web browser application, among other examples.

Figure 1G:
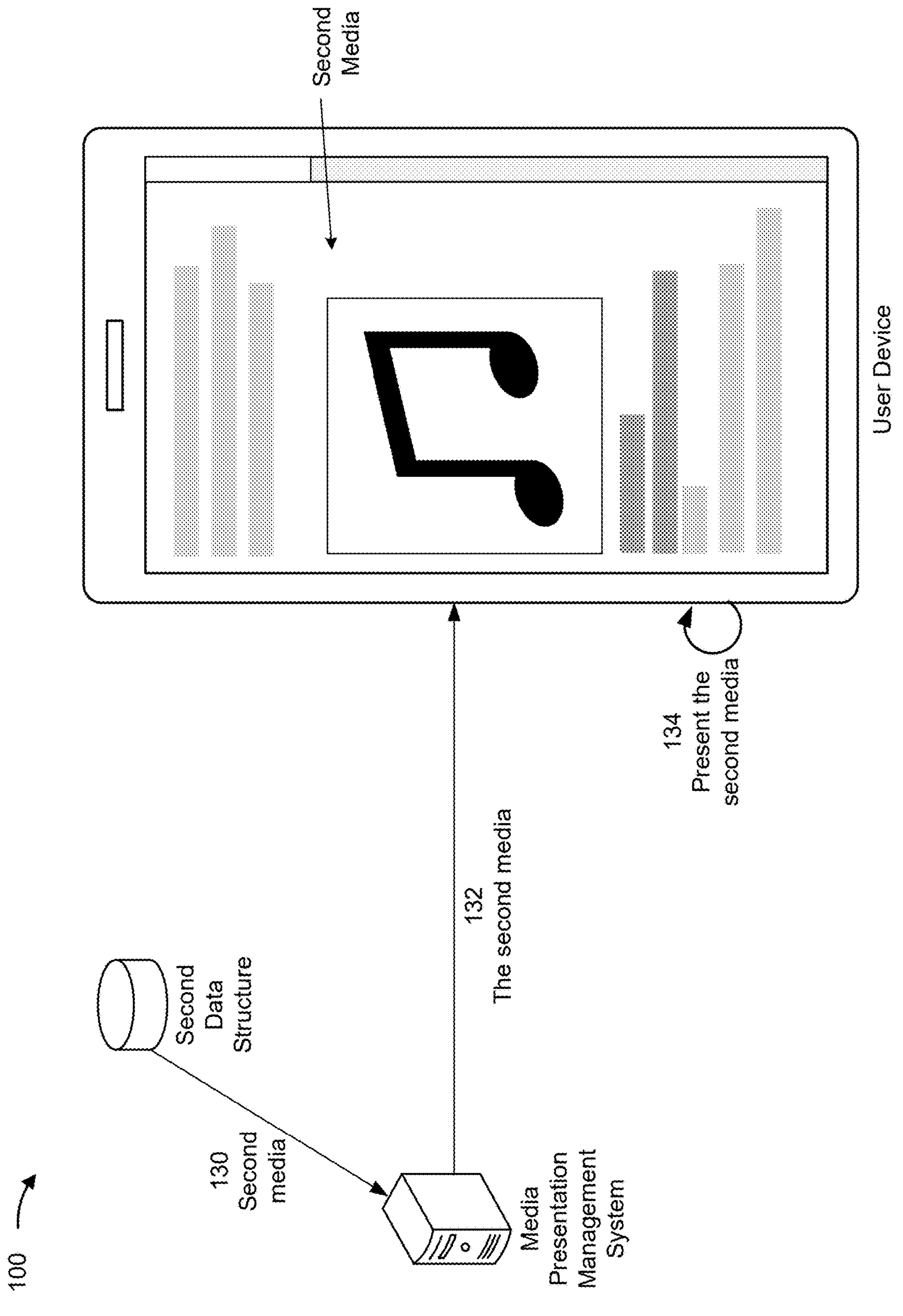
Figure 1F:
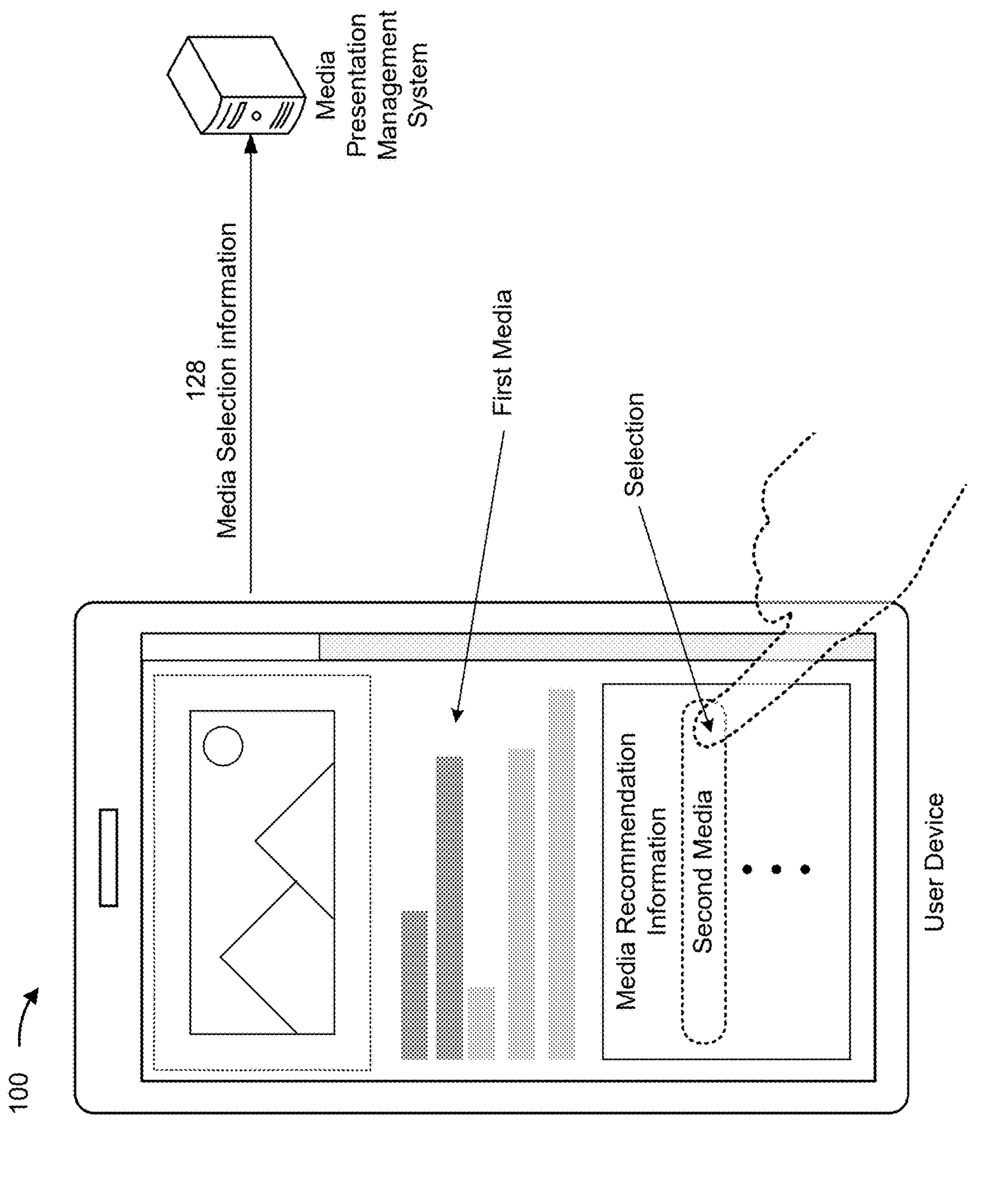

As shown in FIG. 1F, the user device may collect media selection information associated with presentation of the media recommendation information. For example, the media selection information may indicate selection of the second media (and, optionally, other media identified by the media recommendation information). The user device may collect the media selection information as a result of the user interacting with the media recommendation information (e.g., via the user interface of the user device), such as by the user selecting (or deselecting) an object associated with the media recommendation information, by the user adjusting an "agree or disagree" indicator of the media recommendation information, or by the user manipulating another type of interaction component of the media recommendation information.

As shown by reference number 128, the user device may provide the media selection information. For example, the user device may send the media selection information to the media presentation management system (e.g., directly to the media presentation management system). Accordingly, the media presentation management system may obtain the media selection information, such as by receiving the media selection information from the user device.

As shown in FIG. 1G, and by reference number 130, the media presentation management system may obtain the second media (e.g., based on the media selection information). For example, the media presentation management system may process (e.g., parse and/or read) the media selection information to determine that the user selected the second media. Accordingly, the media presentation management system may obtain the second media from a second data structure. The second data structure may be configured to store media, and may store the second media.

As shown by reference number 132, the media presentation management system may provide the second media. For example, the media presentation management system may send the second media to the user device, such as for presentation on the user device (e.g., via the user interface of the user device).

Accordingly, as further shown in FIG. 1G and by reference number 134, the user device may present the second media. For example, the second media may be presented (e.g., visually presented, audibly presented, and/or haptically presented) on the user device via the user interface of the user device.

In some implementations, the media presentation management system may send the second media to the user device for presentation on the user device in association with the first media. For example, the media presentation management system may send the second media to the user device to enable contemporaneous presentation, on the user device, of at least some of the first media and at least some of the second media, or to enable presentation of at least some of the first media at a first time and at least some of the second media at a second time that occurs after the first time (e.g., the second media is presented after the first media without delay, or with a delay on the order of seconds), such as shown in FIG. 1G.

While the operations described herein in association with FIG. 1G described the media presentation management system directly causing the second media to be presented on the user device, the media presentation management system may, alternatively, indirectly cause the second media to be presented on the user device (e.g., without the media presentation management system providing the second media to the user device). For example, the media presentation management system may communicate with the second data structure and/or a service device to cause the second media to be provided to the user device (e.g., for presentation on the user device).

As indicated above, FIGS. 1A-1G are provided as an example. Other examples may differ from what is described with regard to FIGS. 1A-1G.

Figure 2:
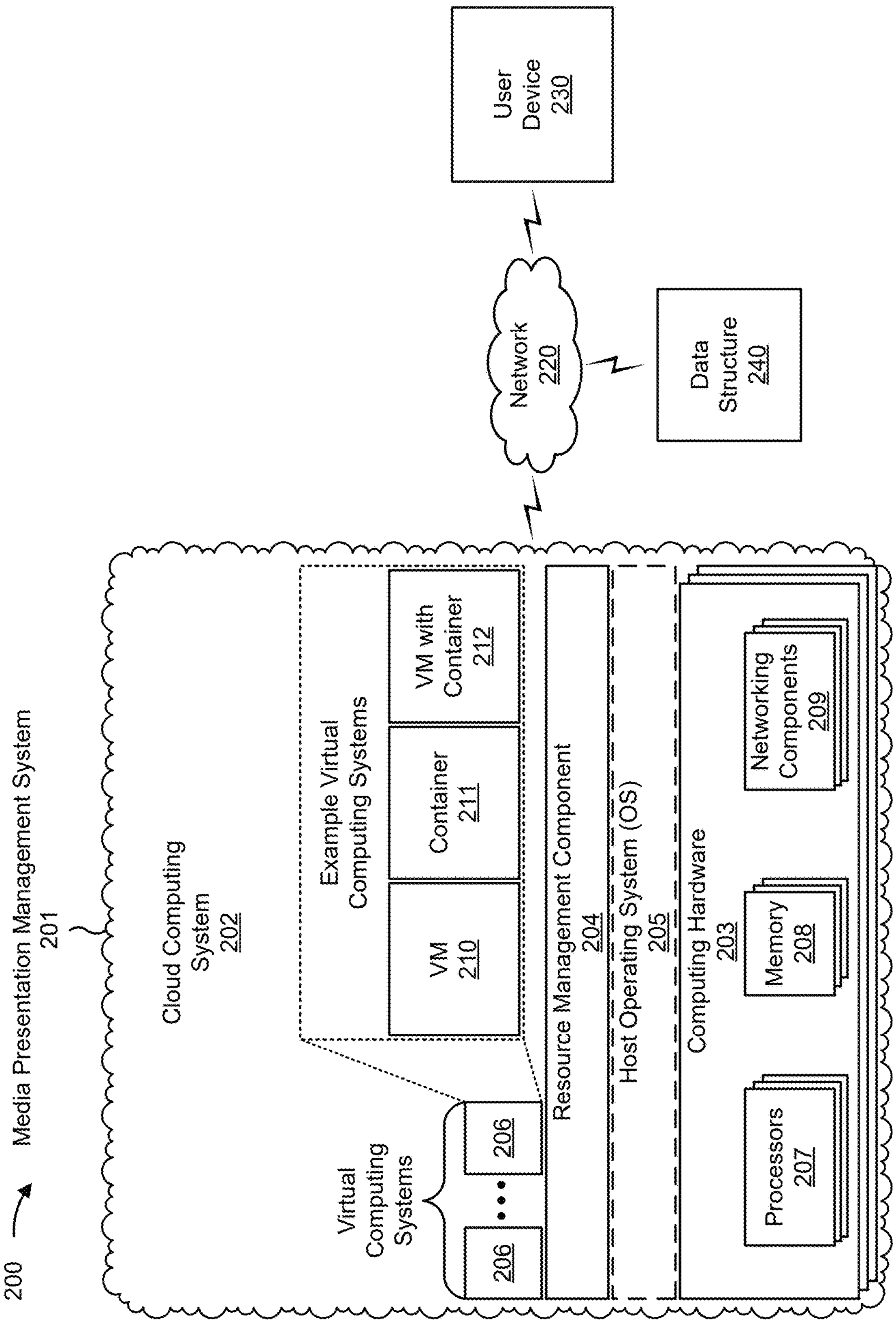
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a media presentation management system 201, which may include one or more elements of and/or may execute within a cloud computing system 202. The cloud computing system 202 may include one or more elements 203-212, as described in more detail below. As further shown in FIG. 2, environment 200 may include a network 220, a user device 230, and/or a data structure 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the media presentation management system 201 may include one or more elements 203-212 of the cloud computing system 202, may execute within the cloud computing system 202, and/or may be hosted within the cloud computing system 202, in some implementations, the media presentation management system 201 may not be cloud-based (e.g., may be implemented outside of a cloud computing system) or may be partially cloud-based. For example, the media presentation management system 201 may include one or more devices that are not part of the cloud computing system 202, such as device 300 of FIG. 3, which may include a standalone server or another type of computing device. The media presentation management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The user device 230 may include one or more devices capable of receiving, generating, storing, processing, and/or providing information associated, as described elsewhere herein. The user device 230 may include a communication device and/or a computing device. For example, the user device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The data structure 240 may include one or more devices capable of receiving, generating, storing, processing, and/or providing information associated, as described elsewhere herein. The data structure 240 may include a communication device and/or a computing device. For example, the data structure 240 may include a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the data structure 240 may store express preference information, behavior information, and/or media, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
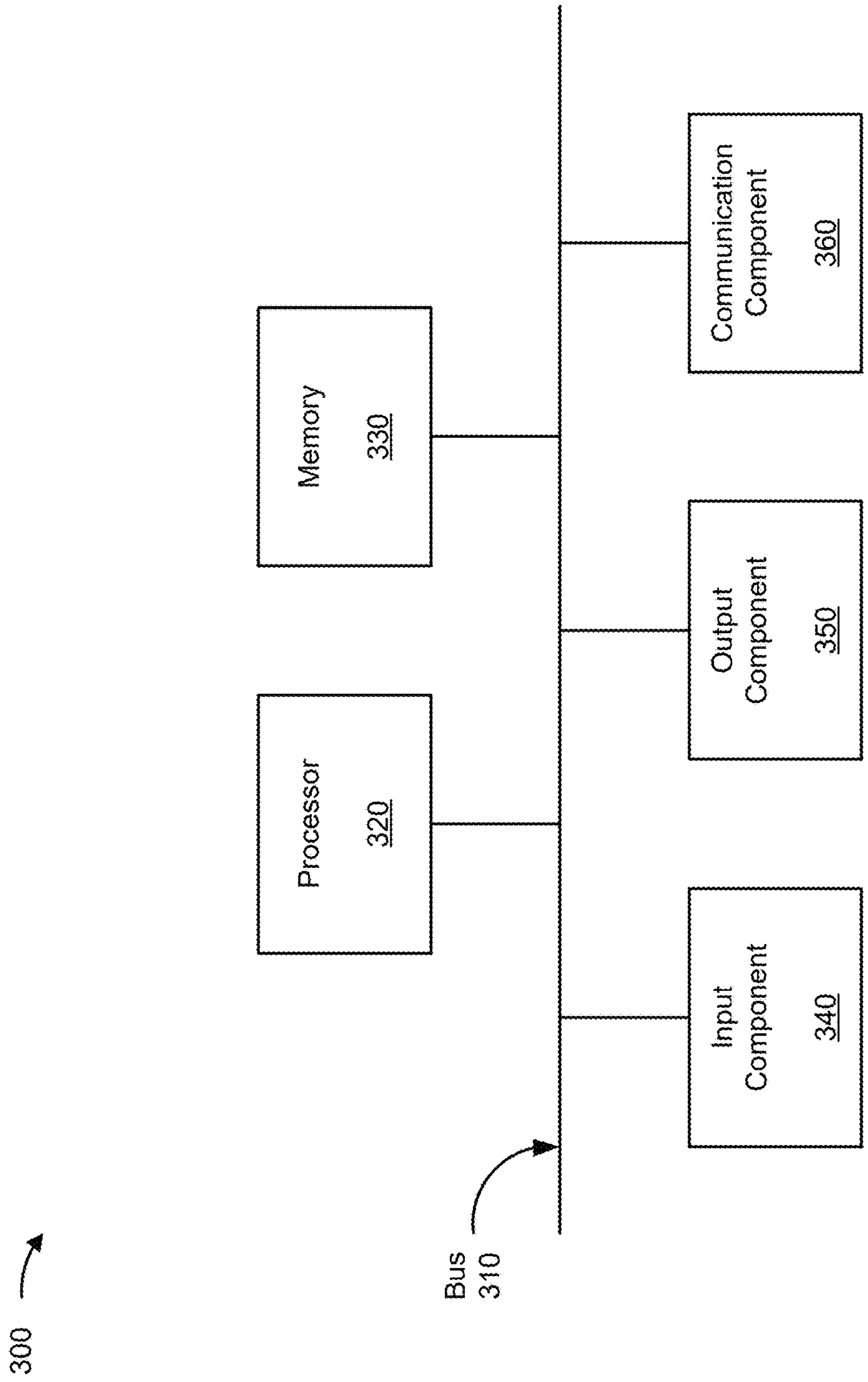
FIG. 3 is a diagram of example components of a device associated with media presentation management, in accordance with some embodiments of the present disclosure.

FIG. 3 is a diagram of example components of a device 300 associated with media presentation management. The device 300 may correspond to the media presentation management system 201, the computing hardware 203, the user device 230, and/or the data structure 240. In some implementations, the media presentation management system 201, the computing hardware 203, the user device 230, and/or the data structure 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
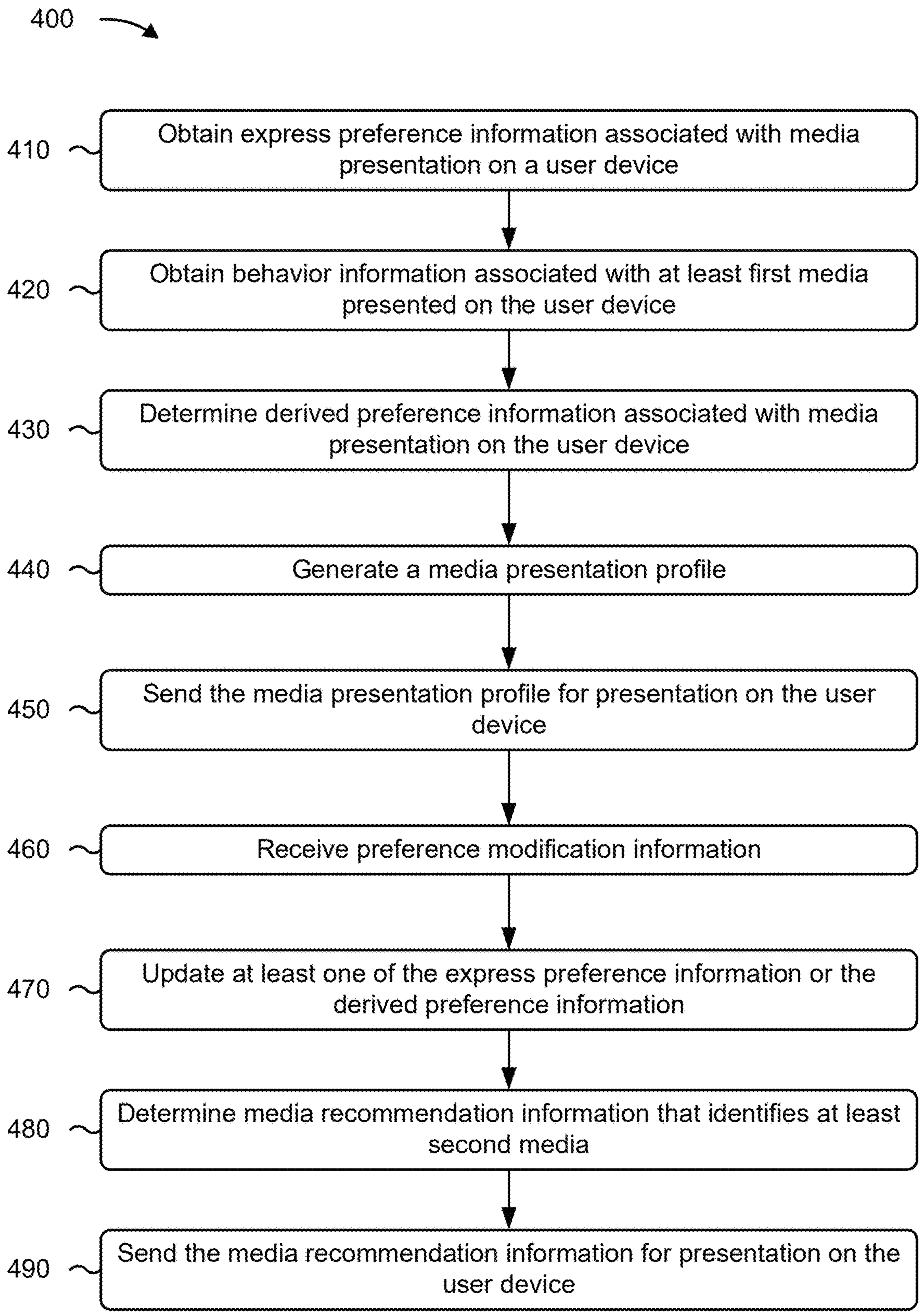
FIG. 4 is a flowchart of an example process associated with media presentation management, in accordance with some embodiments of the present disclosure.

FIG. 4 is a flowchart of an example process 400 associated with media presentation management. In some implementations, one or more process blocks of FIG. 4 may be performed by the media presentation management system 201. In some implementations, one or more process blocks of FIG. 4 may be performed by another device or a group of devices separate from or including the media presentation management system 201, such as the computing hardware 203, the user device 230, and/or the data structure 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining express preference information associated with media presentation on a user device (block 410). For example, the media presentation management system 201 (e.g., using processor 320, memory 330, input component 340, output component 350, and/or communication component 360) may obtain express preference information associated with media presentation on a user device, as described above in connection with reference numbers 102 and 104 of FIG. 1A. As an example, the media presentation management system 201 may obtain the express preference information from the user device or a data structure. The express preference information may indicate one or more express user preferences associated with media presentation on the user device.

As further shown in FIG. 4, process 400 may include obtaining behavior information associated with at least first media presented on the user device (block 420). For example, the media presentation management system 201 (e.g., using processor 320, memory 330, input component 340, output component 350, and/or communication component 360) may obtain behavior information associated with at least first media presented on the user device, as described above in connection with reference numbers 106 and 108 of FIG. 1B. As an example, the media presentation management system 201 may obtain the behavior information from the user device or a data structure. The behavior information may indicate one or more user interactions with at least first media presented on the user device.

As further shown in FIG. 4, process 400 may include determining derived preference information associated with media presentation on the user device (block 430). For example, the media presentation management system 201 (e.g., using processor 320 and/or memory 330) may determine, based on the express preference information and based on the behavior information, derived preference information associated with media presentation on the user device, as described above in connection with reference number 110 of FIG. 1C. As an example, the media presentation management system 201 may process (e.g., using a derived preference analysis technique, which may include using at least one machine learning model technique) the express preference information and the behavior information to determine the derived preference information. The derived preference information may indicate one or more derived user preferences associated with media presentation on the user device.

As further shown in FIG. 4, process 400 may include generating a media presentation profile (block 440). For example, the media presentation management system 201 (e.g., using processor 320 and/or memory 330) may generate a media presentation profile, as described above in connection with reference number 112 of FIG. 1C. As an example, the media presentation management system 201 may generate the media presentation profile to indicate at least some of the express preference information and at least some of the derived preference information.

As further shown in FIG. 4, process 400 may include sending the media presentation profile for presentation on the user device (block 450). For example, the media presentation management system 201 (e.g., using processor 320, memory 330, output component 350, and/or communication component 360) may send the media presentation profile for presentation on the user device, as described above in connection with reference numbers 114 and 116 of FIG. 1C. As an example, the media presentation management system 201 may send, to the user device, the media presentation profile for presentation on the user device in association with the first media.

As further shown in FIG. 4, process 400 may include receiving preference modification information (block 460). For example, the media presentation management system 201 (e.g., using processor 320, memory 330, input component 340, and/or communication component 360) may receive preference modification information, as described above in connection with reference number 118 of FIG. 1D. As an example, the media presentation management system 201 may receive, from the user device and based on sending the media presentation profile, preference modification information that indicates a modification to at least one of the one or more express user preferences or at least one of the one or more derived user preferences.

As further shown in FIG. 4, process 400 may include updating, at least one of the express preference information or the derived preference information (block 470). For example, the media presentation management system 201 (e.g., using processor 320 and/or memory 330) may update at least one of the express preference information or the derived preference information, as described above in connection with reference number 120 of FIG. 1D. As an example, the media presentation management system 201 may update, based on the preference modification information, at least one of the express preference information or the derived preference information.

As further shown in FIG. 4, process 400 may include determining media recommendation information that identifies at least second media (block 480). For example, the media presentation management system 201 (e.g., using processor 320 and/or memory 330) may determine media recommendation information that identifies at least second media, as described above in connection with reference number 122 of FIG. 1E. As an example, the media presentation management system 201 may determine, based on the updated at least one of the express preference information or the derived preference information, media recommendation information that identifies at least second media.

As further shown in FIG. 4, process 400 may include sending the media recommendation information for presentation on the user device (block 490). For example, the media presentation management system 201 (e.g., using processor 320, memory 330, output component 350, and/or communication component 360) may send the media recommendation information for presentation on the user device, as described above in connection with reference numbers 124 and 126 of FIG. 1E. As an example, the media presentation management system 201 may send, to the user device, the media recommendation information for presentation on the user device in association with the first media.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1G. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for media presentation management, the system comprising:

one or more memories; and one or more processors, communicatively coupled to the one or more memories, configured to:

obtain express preference information that indicates one or more express user preferences associated with media presentation on a user device;

obtain behavior information that indicates one or more user interactions with at least first media presented on the user device;

determine, based on the express preference information and based on the behavior information, derived preference information that indicates one or more derived user preferences associated with media presentation on the user device;

generate a media presentation profile that indicates at least some of the express preference information and at least some of the derived preference information, wherein the media presentation profile further indicates, for the derived preference information, an identifier of the express preference information and at least one of a score associated with a degree of influence of the express preference information, or behavior information of the derived preference information;

send, to the user device, the media presentation profile for presentation on the user device in association with the first media;

receive, from the user device and based on sending the media presentation profile, preference modification information that indicates a modification to at least one of the one or more express user preferences or at least one of the one or more derived user preferences;

update, based on the preference modification information, at least one of the express preference information or the derived preference information;

determine, based on the updated at least one of the express preference information or the derived preference information, media recommendation information that identifies at least second media; and send, to the user device, the media recommendation information for presentation on the user device in association with the first media.

2. The system of claim 1, wherein the one or more processors are further configured to:

receive, from the user device and based on sending the media recommendation information, media selection information that indicates selection of the second media; and cause the second media to be presented on the user device.

3. The system of claim 2, wherein the one or more processors, to cause the second media to be presented on the user device, are configured to:

obtain the second media from a data structure; and send the second media to the user device.

4. The system of claim 1, wherein the one or more processors are further configured to:

obtain the express preference information from a data structure; and obtain the behavior information from the data structure.

5. The system of claim 1, wherein sending the media presentation profile enables contemporaneous presentation, on the user device, of at least some of the first media and at least some of the media presentation profile.

6. The system of claim 1, wherein sending the media presentation profile enables presentation, on the user device, of:

at least some of the first media at a first time; and at least some of the media presentation profile at a second time that occurs after the first time.

7. The system of claim 1, wherein the one or more processors, to determine the media recommendation information, are configured to:

process, using at least one machine learning model technique, the updated at least one of the express preference information or the derived preference information to determine the media recommendation information.

8. The system of claim 1, wherein the express preference information and the derived preference information are output in different portions of a user interface generated on the user device.

9. A non-transitory computer-readable medium storing a set of instructions, the set of instructions comprising:

one or more instructions that, when executed by one or more processors of a system for media presentation management, cause the system to:

obtain express preference information associated with media presentation on a user device;

obtain behavior information associated with at least first media presented on the user device;

determine, based on the express preference information and based on the behavior information, derived preference information associated with media presentation on the user device;

generate a media presentation profile that indicates at least some of the express preference information and at least some of the derived preference information, wherein the media presentation profile further indicates, for the derived preference information, an identifier of the express preference information and at least one of a score associated with a degree of influence of the express preference information, or behavior information of the derived preference information; and send, to the user device, the media presentation profile for presentation on the user device in association with the first media.

10. The non-transitory computer-readable medium of claim 9, wherein the one or more instructions, when executed by the one or more processors, further cause the system to:

receive, from the user device and based on sending the media presentation profile, preference modification information; and update, based on the preference modification information, at least one of the express preference information or the derived preference information.

11. The non-transitory computer-readable medium of claim 9, wherein the one or more instructions, when executed by the one or more processors, further cause the system to:

determine, based on receiving preference modification information from the user device, media recommendation information that identifies at least second media; and send, to the user device, the media recommendation information for presentation on the user device in association with the first media.

12. The non-transitory computer-readable medium of claim 11, wherein the one or more instructions, that cause the device to determine the media recommendation information, cause the device to:

process, using at least one machine learning model technique, at least one of the express preference information or the derived preference information to determine the media recommendation information.

13. The non-transitory computer-readable medium of claim 9, wherein:

the express preference information is obtained from a data structure; and the behavior information is obtained from the data structure.

14. The non-transitory computer-readable medium of claim 9, wherein sending the media presentation profile enables presentation, on the user device, of:

at least some of the first media at a first time; and at least some of the media presentation profile at a second time that occurs after the first time.

15. A method of facilitating media presentation management, comprising:

determining, by a system, based on express preference information associated with media presentation on a user device, and based on behavior information associated with at least first media presented on the user device, derived preference information associated with media presentation on the user device;

generating, by the system, a media presentation profile that indicates at least some of the express preference information and at least some of the derived preference information, wherein the media presentation profile further indicates, for the derived preference information, an identifier of the express preference information and at least one of a score associated with a degree of influence of the express preference information, or behavior information of the derived preference information; and sending, by the system and to the user device, the media presentation profile for presentation on the user device in association with the first media.

16. The method of claim 15, further comprising:

updating, based on sending the media presentation profile and based on preference modification information received from the user device, at least one of the express preference information or the derived preference information.

17. The method of claim 15, further comprising:

determining, based on receiving preference modification information from the user device, media recommendation information that identifies at least second media; and sending, to the user device, the media recommendation information for presentation on the user device.

18. The method of claim 15, further comprising:

determining, based on receiving preference modification information from the user device, media recommendation information that identifies at least second media; and causing the second media to be presented on the user device.

19. The method of claim 15, wherein sending the media presentation profile enables contemporaneous presentation, on the user device, of at least some of the first media and at least some of the media presentation profile.

20. The method of claim 15, wherein sending the media presentation profile enables presentation, on the user device, of:

at least some of the first media at a first time; and at least some of the media presentation profile at a second time that occurs after the first time.

* * * * *